UNITED STATES PATENT OFFICE.

ROBERT V. BROWN, OF CHICAGO, ILLINOIS, ASSIGNOR TO THE SHERWIN-WILLIAMS COMPANY, OF CLEVELAND, OHIO, A CORPORATION OF OHIO.

INSECTICIDE OR FUNGICIDE AND METHOD OF MAKING SAME.

1,235,285.   Specification of Letters Patent.   Patented July 31, 1917.

No Drawing.   Application filed July 13, 1914.   Serial No. 850,570.

*To all whom it may concern:*

Be it known that I, ROBERT V. BROWN, a citizen of the United States, and a resident of Chicago, county of Cook, and State of Illinois, have invented a new and useful Improvement in Insecticides or Fungicides and Methods of Making Same, of which the following is a specification, the principle of the invention being herein explained and the best mode in which I have contemplated applying that principle, so as to distinguish it from other inventions.

The present invention provides a new process for producing a new product having those properties essential to an insecticide and fungicide.

In the manufacture of Paris green by the use of arsenious oxid and copper acetate, there is also a considerable loss of arsenic and copper because the reactions which take place in the manufacture, produce certain alkaline materials which tend to prevent the precipitation of the arsenic and copper to form Paris green. The material lost from this cause, is of considerable value, and it is very difficult to recover it from the residual liquor in such form as to render it marketable.

The present invention effects a valuable recovery of the substances remaining in the residual liquor of the manufacture of Paris green, and the conversion of the recovered substances into a highly effective insecticide and fungicide.

The residual liquor from the manufacture of Paris green contains arsenic which is present as sodium arsenite $Na_3AsO_3$, and copper which is present as copper arsenite. In carrying out my process, slaked lime $Ca(OH)_2$ is added in an amount determined by the amount of arsenic found by analysis to be present in the residual liquor. Upon agitation, the lime reacts with the sodium arsenite $Na_3AsO_3$ to form sodium hydrate NaOH, and a precipitate of calcium arsenite $Ca_3(AsO_3)_2$, and at the same time the copper arsenite $CuHAsO_3$ is precipitated from the solution. The precipitate is immediately filter-pressed to remove the sodium hydrate, and the pressed precipitate is then thoroughly broken up and agitated in water.

Acid arsenate of lead $PbHAsO_4$ is now added to the precipitate in water, and the mass is thoroughly agitated. I have found that advantageous results may be obtained by using lead arsenate in substantially the proportion of 28 pounds to each 100 pounds of arsenious oxid equivalent present in the residual liquor. Copper sulfate $CuSO_4.5H_2O$ dissolved in water is now added to the mass, and I have found that advantageous results may be obtained by using copper sulfate substantially in the proportion of 170 pounds to each 100 pounds of arsenious oxid $As_2O_3$ equivalent present in the residual liquor. The mass is now thoroughly agitated, and slaked lime is again added to precipitate copper hydrate $Cu(OH)_2$ from the copper sulfate which has been added. The precipitating copper hydrate forms itself around the particles of calcium arsenite, copper arsenite and lead arsenate in molecular condition, and after the mass has been agitated until it is of uniform consistency, the resulting solid is allowed to settle, after which it is washed and filter-pressed.

This resulting solid product may be marketed in paste form by leaving the desired amount of water in it, or it may be marketed in dry form, by drying the filter-pressed product and then pulverizing it. I have found that by using substantially the proportions stated, in recovering the valuable constituents from a typical residual liquor from the manufacture of Paris green, the product will be an effective one containing substantially 58 per cent. of calcium arsenite and copper arsenite in the aggregate, 8 per cent. of acid lead arsenate, 14 per cent. of copper hydrate, and not to exceed 20 per cent. of remaining inert substances.

It may at times be desirable to manufacture this product when residual liquor from the manufacture of Paris green is not available. In such instances, arsenious oxid may be boiled with soda ash in substantially the proportion of 400 pounds of oxid to 246 pounds of soda ash $Na_2CO_3$, and there will result a solution containing sodium arsenite. Agitation of this solution with slaked lime produces the reaction before described, and precipitates calcium arsenite. Acid lead arsenate is then added to the precipitate and intimately mixed therewith, after which copper sulfate in water is added to the mixture, and the agitation of slaked lime with the resulting mixture will, as before described, precipitate copper hydrate in molecular condition around the calcium arsenite and the lead arsenate. This product may then be filter-pressed and marketed in either paste or dry form. The product just described, constitutes an effective insecticide and fungicide, but if it be desired that it also contain copper arsenite, a small quantity of Paris green may be agitated with the mixture before it is filter-pressed.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a process to prevent the loss of arsenic and copper in the manufacture of Paris green, the steps which consist in precipitating calcium arsenite from a solution containing sodium arsenite by the action of lime, mixing lead arsenate with the precipitate, and adding to the mixture copper sulfate and lime.

2. In a process to prevent the loss of arsenic and copper in the manufacture of Paris green, the steps which consist in precipitating calcium arsenite and copper arsenite from a solution containing sodium arsenite and copper arsenite by the action of lime, mixing lead arsenate with the precipitate, and adding to the mixture copper sulfate and lime.

3. The insecticide or fungicide, comprising the following substances in substantially the proportion stated, 58% of calcium arsenite and copper arsenite in the aggregate, 8% of lead arsenate, 14% of copper hydrate, and including not to exceed 20% of inert substances.

Signed by me, this 8th day of July, 1914.

ROBERT V. BROWN.

Attested by—
 OLIVER BOX,
 E. I. MUNRO.